United States Patent [19]

Schmidt et al.

[11] Patent Number: 4,682,894

[45] Date of Patent: Jul. 28, 1987

[54] CALIBRATION OF THREE-DIMENSIONAL SPACE

[75] Inventors: Richard Schmidt, Huntington; Howard Stern, Greenlawn; Alex Mauro, Wheatley Heights; Joseph Ross, Fort Salonga, all of N.Y.

[73] Assignee: Robotic Vision Systems, Inc., Hauppauge, N.Y.

[21] Appl. No.: 714,253

[22] Filed: Mar. 21, 1985

[51] Int. Cl.[4] .................. G01B 11/00

[52] U.S. Cl. .................. 356/375; 356/243

[58] Field of Search .................. 356/1, 375, 376, 243; 250/560, 561

[56] References Cited

U.S. PATENT DOCUMENTS 4,188,544 2/1980 Chasson .................. 356/376

4,375,921 3/1983 Morander .................. 356/381

*Primary Examiner*—F. L. Evans

*Attorney, Agent, or Firm*—Max Fogiel

[57] ABSTRACT

An arrangement in which three-dimensional measurement sensors are calibrated using linear translation of three flat plates, one orthogonal to the path, one sloping vertically, one sloping horizontally. Sensors for which linear interpolation applies need only calibrate two surfaces of the sensor volume for complete calibration. Two flat surfaces are adequate for calibrating a volume if one surface is used twice.

16 Claims, 12 Drawing Figures

CALIBRATION OF THREE-DIMENSIONAL SPACE

BACKGROUND OF THE INVENTION

Optical triangulation systems are coming into greater usage for machine vision for automated inspection, material handling, assembly and a variety of manufacturing tasks. The precision of these measurement systems relies on the accuracy of calibration and the ability of the system to retain the calibrated accuracy. It has thus become important to devise methods for rapid and accurate calibration of three-dimensional sensors.

The manufacture of precision calibration equipment is potentially expensive because of the difficulty in obtaining the necessary accuracy. The cost can best be reduced by using the simplest shapes, minimum number of parts and using inherrently accurate machining procedures.

The accuracy of calibration of optical sensors can be adversely affected by surface reflectivity variations caused by surface attitude as well as reflection coefficient and specularity. Flat, matte surfaces best reduce inaccuracy from these causes.

SUMMARY OF THE INVENTION

It is the object of the present invention to overcome the prior art disadvantages. In particular, it is the object of the present invention to improve accuracy, reduce cost of implementation and simplify usage.

In keeping with these objects, and with still others which will become apparent as the description proceeds, the important characteristics of the invention are: ease of manufacture, verifiable accuracy and rapid sensor calibration.

A first embodiment of the present invention is comprised as follows: a very flat plate is manufactured and the surface is either coated or modified to obtain a diffuse reflective characteristic. The plate is mounted on a precision translation mechanism and aligned to be perpendicular to the direction of motion. The vision sensor is set up such that the plate, at its center of travel, lies at the center of the sensor field of vision and perpendicular to the sensor measurement axis. The measurement made by the sensor at that location becomes zero depth. Measurements of the plate made at precise increments from center along the direction of translation become accurately calibrated depths. Similarly, by placing the plate, or one like it, at a precise angle and making measurements at various increments along the translation axis, distances orthogonal to the direction of translation are obtained.

Alternately, the sensor can be translated instead of the plates to effect the same calibration.

A third variation of the invention abandons the use of a single direction of translation in favor of using more than one translation mechanism. Again relative changes in distance between the sensor and plate provide the calibration reference values so that the translation of the sensor or plate are equally effective. The first step remains the same and depth is calibrated by moving a flat plate along the sensor measurement axis with the plate perpendicular to the direction of motion. A plate at a precise angle is then translated perpendicular to the sensor measurement axis and from measurements on the plate, distances orthogonal to the sensor measurement axis are calibrated. This is repeated for the third axis.

Another aspect of the invention comprises an efficient method of calibrating certain types of volumetric sensors. Two opposite sides of the vision volume are calibrated, preferably the front and rear, and all interior points are obtained by interpolation.

Where interpolation cannot be used, the entire volume is calibrated and the data stored as a reference. The method of obtaining the data is the repetitive application of the methods presented above. Several configurations of calibration devices are illustrated.

The invention will hereafter be described with reference to an exemplary embodiment, as illustrated in the drawing. However, it is to be understood that this embodiment is illustrated and described for the purpose of information only, and that nothing therein is to be considered limiting of any aspect of the invention.

DESCRIPTION OF PREFERRED EMBODIMENTS

Figure 1:
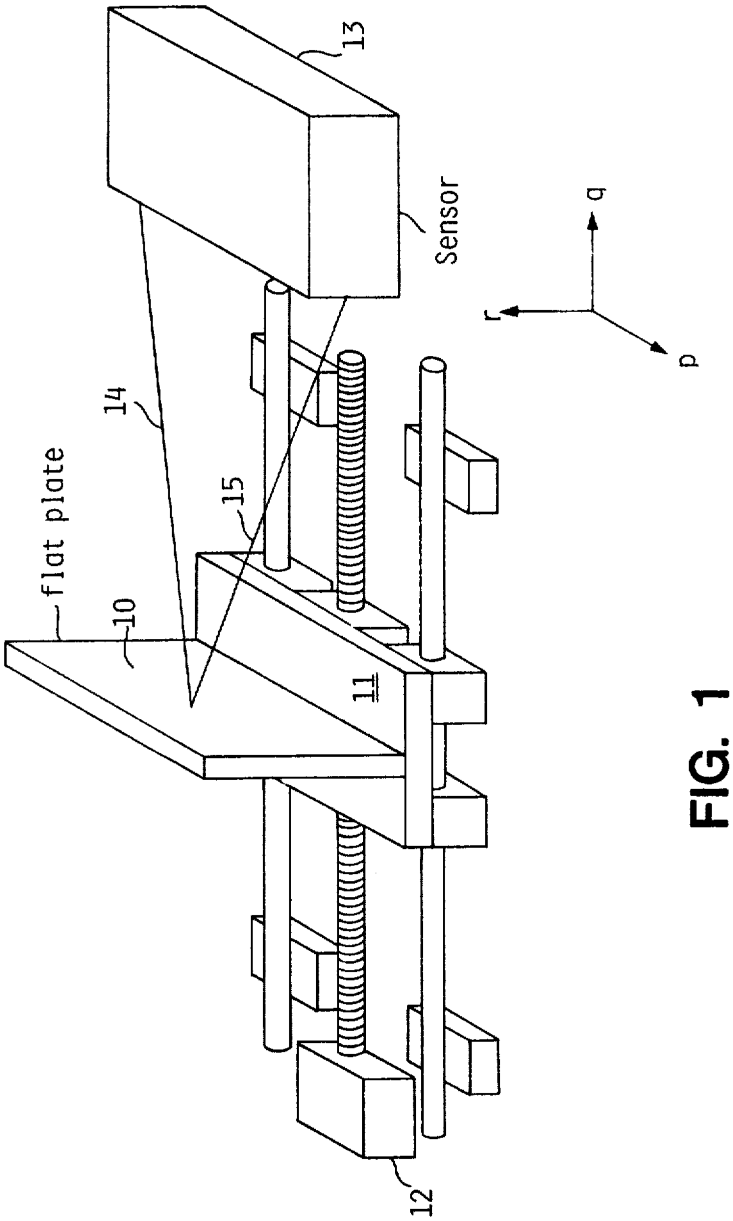
FIG. 1 is a schematic view and illustrates a preferred embodiment of the invention with a flat plate prependicular to the direction of translation and a sensor measuring distance to the plate.

It is possible to obtain plates flat to +/−0.0001 inch for reasonable costs. It is also possible to build precision translation tables or to instrument a table to accurately report its position. FIG. 1 illustrates the mounting of a very flat plate 10 on translation table 11 perpendicular to the direction of translation. Optical sensor 13 to be calibrated is placed with its measurement axis parallel to the direction of translation. Drive mechanism 12 is used to move table 11 twoard and away from sensor 13. Precision squares and indicators can be used to verify that plate 10 is perpendicular to the direction of travel or measure the deviation from perpendicular. Sensor 13 emits rays of light 14 that illuminate a small area of plate 10. A light sensor such as a TV camera in sensor 13 receives rays of light 15 from the illuminated area and transmits a unique signal to a signal processor for interpretation. Relying on the ability of sensor 13 to always send the same unique signal whenever a surface reflects projected light 14 from the same relative to sensor 13, the sensor system can reliably measure the point. The position of table 11 becomes the measured value for each point measured at that table 11 position. A calibration system merely must identify the measurement value of each measureable point and the sensor will report the correct value when measuring an unknown surface. The method is one of a substitution of the unknown surface at the same location as the known calibration surface. At the completion of this step, the sensor is completely calibrated in depth (q direction), but lacks calibration in the remaining two directions (p and r).

Figure 6:
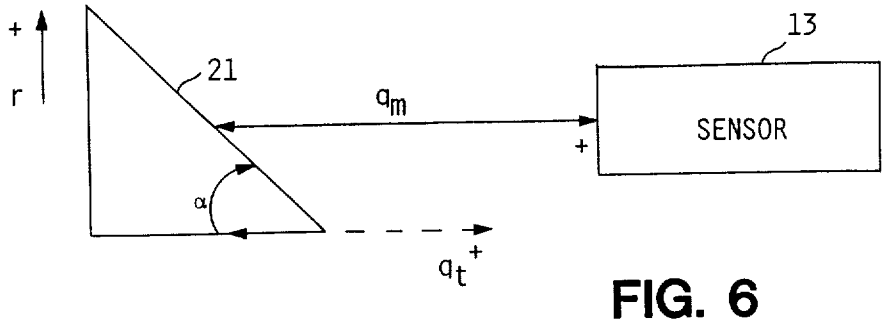
FIG. 6 is a diagrammatic view for calibration of the r direction in one method of calibration related to FIGS. 2*a* and 2*b;*

The calibration of the p and r directions use a method similar to that used for the q direction. A flat plate, inclined to the axis of interest, is used to convert the precisely calibrated q depths to precise measurements along the axis of interest. FIG. *2a* illustrates a way of providing three flat plates 20, 21, 22 mounted on a common base 23 that have the necessary angular orientations. Common base 23 is mounted on translation table 11 with a precision slideway 24 orthogonal to the translation direction (or alternatively the sensor can be translated sideways) to enable the sensor to view any one of the plates 20, 21 or 22. Plate 20 would be used to calibrate the q direction as described above. Then plate 21 would be moved into view of the sensor and the r direction would be calibrated. Plate 21 would be constructed at a known angle, preferably 45° to the q direction and placed such that points on the surface of plate 21 at a constant height (r direction) are at a constant depth, q. Table 11 is then translated in the q direction while sensor 13 measures the surface of plate 21. By recording the q value of table 11 when each measurement of the surface of plate 21 is made, the value of r measured by the sensor 13 can be established. Since sensor 13 will report a depth q for any point on the surface at the time of measurement (i.e. at the time the point is illuminated by sensor 13), the recorded q value of table 11 at the time of that measurement can be associated with the same point while the plate is moving. From FIG. 6 it can be seen that relative changes in r can be associated with each measured point. The applicable relationships are given below:

$$\Delta r = \Delta q_t \tan \alpha \text{ for } q_m = \text{constant}$$

$$\Delta r = -\Delta q_m \tan \alpha \text{ for } q_t = \text{constant}$$

$$\Delta r_{total} = (\Delta q_t - \Delta q_m) \tan \alpha$$

$q_m$ = Sensor measured q $q_t$ = recorded value of table 11 position

Figure 7:
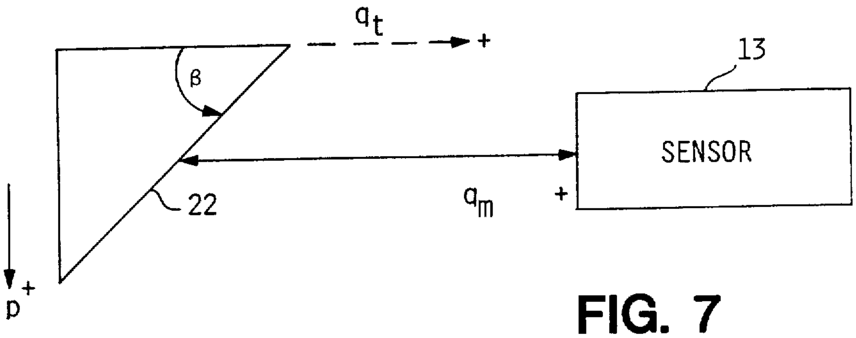
FIG. 7 is a diagrammatic view for calibration of the p direction in one method of calibration related to FIGS. 2*a* and 2*b;*

To calibrate the p direction, plate 22 is brought into view of sensor 13 and measurements made in the same manner as for the r direction calibration, as shown in FIG. 7. The applicable relationships are given below:

$q_m$ = Sensor measured q $q_t$ = recorded value of table 11 position $$\Delta p = \Delta q_t \tan \beta \text{ for } q_m = \text{constant}$$

$$\Delta p = q_m \tan \beta \text{ for } q_t = \text{constant}$$

$$\Delta p_{total} = (\Delta q_t - \Delta q_m) \tan \beta$$

Plate 22 is constructed at a known angle, preferably 45° to the q direction, and placed such that points on the surface of plate 22 at a constant lateral distance (p direction) are at a constant depth, q.

At the end of these three steps every point measurable by sensor 13 has three values, p, q, r, associated with the point which may be retained as a reference table for the sensor.

Error Analysis

The accuracy of this calibration method depends on many parameters which must be controlled or measured. The reference table may then be corrected for these errors to the level of accuracy obtainable by the measuring equipment.

Plate Flatness

Setting the plate perpendicular to the direction of translation simplifies calibration by assuring that every point measured by sensor 13 is at the same depth. Any deviation from absolute flatness contributes directly to an error in depth (i.e. 0.0001" error in flatness produces 0.0001" error in depth). Similarly, errors in flatness on plates 21 and 22 contribute to errors in r and p.

Plate perpendicular to translation direction

Since all measurements are assumed to be at the same depth, the face of plate 20 is, by definition, parallel to the p-r plane. Any angular deviation introduces an error. Two types of errors are possible. First, if plate 20 is at a fixed angle to the direction of travel then $\Delta q_{actual} = \Delta q_{recorded}(\cos \gamma)$ where $\gamma$ is the angular amount that the plate 20 surface deviates from perpendicular. Note that the q axis is calibrated to be perpendicular to the plate 20 surface, not the direction of translation. The second type of error occurs if the plate angle wobbles during translation. Taking any one plate 20 surface angle as a base reference location and calling subsequent angular deviations $\delta$ measured relative to the base reference location angle we get:

$$\Delta q_{actual} = \Delta d \tan \delta$$

where d is the distance from the intersection of the ideal plane and plane at angle $\delta$. It should be noted that $\gamma$ and $\delta$ can be resolved into components in the r and p directions so that the q error may be different for each of those directions for both $\gamma$ and $\delta$.

Translation accuracy

Any error in measuring the amount of translation directly affects the calibration accuracy (i.e. 0.0001" error produces 0.0001" error).

Plate at angle to assume direction

Plates 21 and 22 are assumed to be parallel to the p and r axes respectively as defined by plate 20 surface when measured at the base reference location. Deviations from these assumptions produce errors in the calibration of r and p values respectively similar to the errors caused by plate 20 surface not being perpendicular to the direction of translation.

$$\Delta r_{actual} = p(\tan \epsilon) \tan \alpha$$

$$\Delta p_{actual} = r(\tan \zeta) \tan \beta$$

where $\epsilon$ and $\zeta$ are the angular errors of plates 21 and 22 from being parallel to the p and r axes respectively. (By appropriate choice $\epsilon$ can be zero)

Plate angle error

Plates 21 and 22 are constructed to be at angles $\alpha$ and $\beta$. Even if not constructed accurately to design values, $\alpha$ and $\beta$ can be measured to a high degree of accuracy. However, any change in orientation at the time of calibration will produce errors in r and p much the same as plate 20 orientation error $\gamma$ affected q calibration. Thus the errors are:

$$\Delta r = \Delta q(\tan(\alpha+\eta) - \tan\alpha)$$

$$\Delta p = \Delta q(\tan(\beta+\theta) - \tan\beta)$$

where $\eta$ and $\theta$ are the angular errors of plates 21 and 22 relative to the assumed values of $\alpha$ and $\beta$ and $\Delta q$ = deviation of the measured depth of the point from a fixed reference depth.

Cumulative errors

Since the values of r and p depend on the calibrated q values, errors in q propogate into r and p errors. The first order approximation to these errors are:

$$\Delta r = q_\epsilon \tan\alpha$$

$$\Delta p = q_\epsilon \tan\beta$$

where $q_\epsilon$ is the error in q.

Figure 2B:
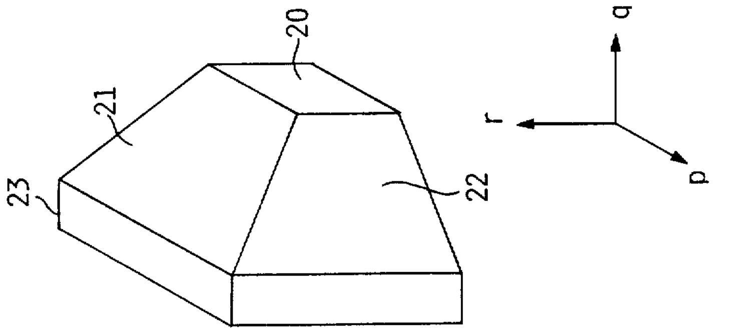
FIG. 2*b* shows 3 flat surfaces at appropriate angles on a block.

FIG. 2*b* illustrates a more compact means of providing the three surfaces 20, 21, 22, however, because surface 21 is not viewable by the sensor 13 when translating sensor 13 or common base 23 along a single translation path that enables sensor 13 to view surfaces 20 and 22, two translation axes are required.

A second method of calibrating a sensor requires precision translation of the plates 20, 21, 22 along more than one axis. This may in some instances be preferable because the axes exist for other reasons. A preferred embodiment provides translation of sensor 13 or common base 23 along axes p, q, r. If the travel in the p direction is sufficient, then precision slidaway 24 is not required. Precision squares and indicators can be used to verify that the translation paths are mutually orthogonal or to determine their precise deviation from orthogonality to be used in correcting the calibration data.

The first step of calibration is the same as in the first method. Surface 20 is placed in view of sensor 13. Surface 20 is then moved along the q axis and the measurements of sensor 13 are associated with the relative positions of surface 20 as provided by precision measurement of table 11 locations.

Next, surface 21 is placed in view of sensor 13 and moved in the r direction while recording the relative location and measurements made by sensor 13. These measurements are also associated with the relative locations so that all sensor 13 measurable points now contain two associated values; one for q and one for r.

Next surface 22 is placed in view of sensor 13 and moved in the p direction while recording the relative location and measurements made by sensor 13. These measurements are also associated with the relative locations so that all sensor 13 measurable points now contain three associated values; one each for p, q and r.

It should be noted that the angle of the plates 21 and 22 still relate depth measured along an axis, q, perpendicular to plate 20 to distance from that axis. Therefore the orientation of each plate to the depth axis, q, and to each other must be precisely known.

Error analysis

Second method of calibration.

Plate flatness

Similar errors will be introduced by plate 20, 21 and 22 as in the first method.

Plate perpendicular to translation direction

Same as for the first method for q values obtained from plate 20.

Translation accuracy

Same as for first method for q values and now also for r and p translation values.

Plate at angle to assumed direction

Plates 21 and 22 are ideally parallel to the p and r axes respectively as defined by plate 20 surface when measured at the base reference location and, say, the r translation direction. (Two angles are established by plate 20 and the third angle by the r translation.) Deviations from these assumptions produce errors in the calibration of r and p values respectively similar to the errors caused by plate 20 surface not being perpendicular to the direction of translation.

Figure 8:
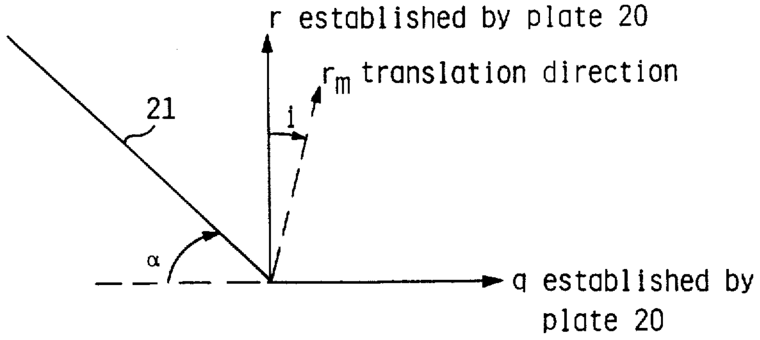
FIG. 8 is a diagrammatic view for calibration of the r direction in another method of calibration from that shown by FIG. 6.

From FIG. 8:

$$r = -q\tan\alpha + r_m\cos\iota + p(\tan\epsilon)\tan\alpha$$

where $r_m$ is the measured translation $\epsilon$ is the angular error of plate 21 from being parallel to the pin axis.

$\iota$ is shown in true view since the $r_m$ translation direction has been chosen, as a reference direction.

$\alpha$ is actual value.

Figure 9:
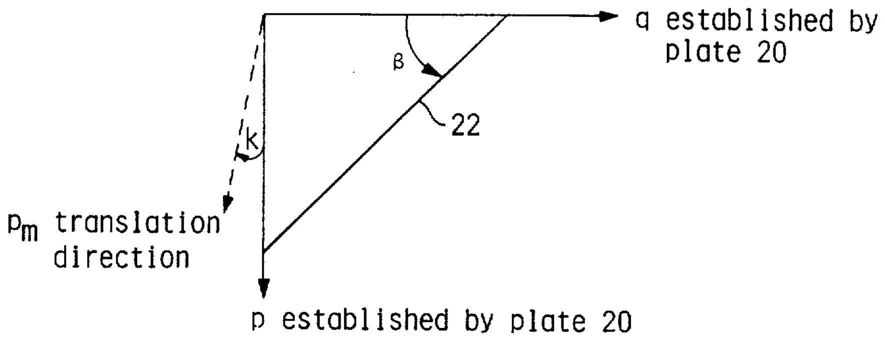
FIG. 9 is a diagrammatic view for calibration of the p direction in another method of calibration from that shown by FIG. 7.

From FIG. 9:

$$p = -q\tan\beta + p_m\cos\kappa + r(\tan\zeta)\tan\beta$$

where $p_m$ is the measured translation $\kappa$ is the angle between the p axis and $p_m$ translation directions containing a component in both the p-q and r-p planes.

$\zeta$ is the angular error of plate 22 from being parallel to the r axis.

$\beta$ is actual value.

Cumulative errors

As in the first method, r and p depend on q so that errors in q effect r and p in the same manner.

Figure 3:
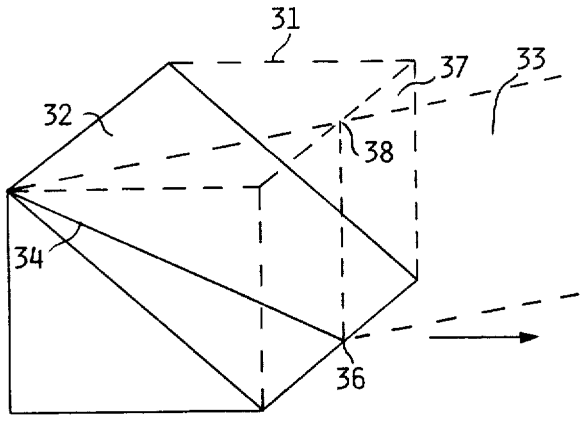
FIG. 3 illustrates the intersection of a plane of light with a sloped block.

Calibration of vision sensors can run into the problem of storing vast amounts of data. To calibrate volume 31 shown in FIG. 3, a sensor may project a plane of light 33 through the volume and view the intersection 34 of plane 33 and calibration surface 32. Alternately a ray (or narrow beam) of light may be projected to obtain one point of intersection or a volume of coded light projected to obtain all surface 32 points within volume 31. When a ray or plate of light is used, then multiple positions of the ray or plane are used to obtain all surface 32 points within volume 31. Surface 32 is then moved to alternate locations so that all points within volume 31 can be calibrated. Since the number of points within volume 31 can be very large for high resolution systems, it can take a long time to measure all the points, and data storage requirements become very large. The following method provides a way to minimize calibration time and storage requirements. It is based on the assumption that linear relationships exist within sensors employing triangulation to make measurements. If nonlinearities exist, but are slight, then segmenting curved regions into smaller regions will reduce the amount of error introduced by the assumed linearity as is well known. By applying this technique in the following unique way a significant improvement in the state-of-the-art is achieved. The resultant reference table also lends itself to readily computing measured values from the given sensor data.

Briefly stated, two surfaces, preferably the surface nearest the sensor and the surface furthest from the sensor of volume 31 are calibrated and light rays from the sensor's projector and camera are assumed to travel in straight lines from the nearest to furthest surface. By identifying the paths that intersecting camera and projector rays follow through the nearest and farthest surfaces, the exact measurement of the point of intersection can be computed.

Figure 4:
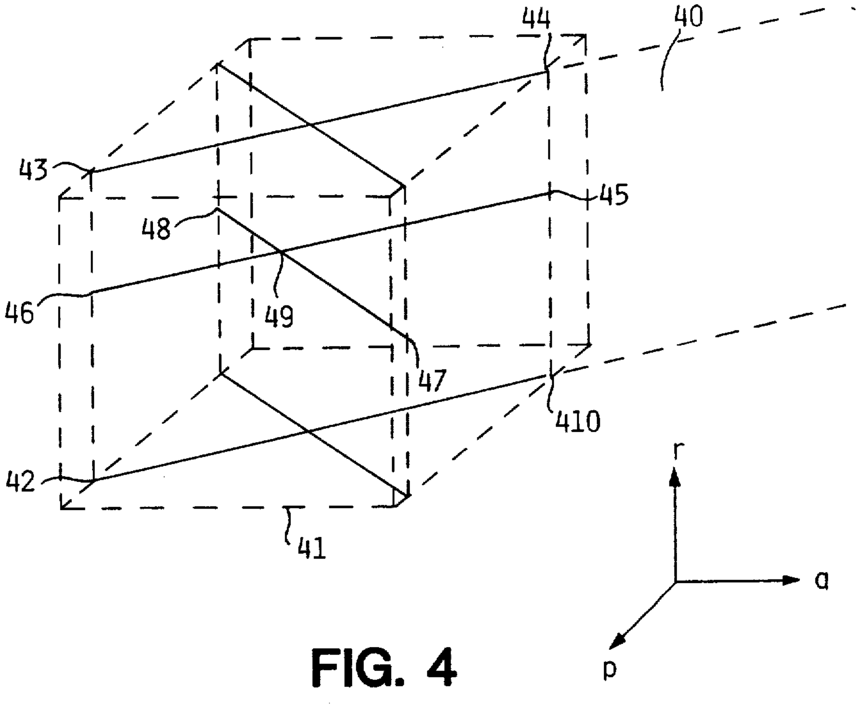
FIG. 4 illustrates a vision volume with projector and camera rays intersecting to obtain a measurement.

The calibration steps are:

1. Light plane 40 (FIG. 4) is projected through volume 41. A camera views the part of plane 40 within volume 41 and images the intersection of plane 40 with a surface to be measured within volume 41. Each ray from the projector such as 45-46 intersects the surface to be measured such as at point 49. An intersecting ray such as 47-48 from the camera images the intersection in a unique location within the camera. By placing the surface to be measured at the nearest surface of volume 41, all points along intersection 44-410 can be recorded.
2. By placing the surface to be measured at the furthest surface of volume 41, all points along intersection 42-43 can be recorded.
3. Repeating this procedure for all intersections on both surfaces (usually best to do one surface completely and then the other) gives all the needed depth information when using flat plates as previously described. If a grid pattern surface is used, all three dimensions would be obtained in this step and the next two steps can be skipped.
4. Moving a sloped path such as 32 through volume 31 can now provide vertical calibration information as previously described. Point 36 on the nearest surface 37 of volume 31 would be obtained for the position of surface 32 shown. As the surface 32 moves toward the sensor, the point of intersection 36 formed by surface 32, surface 37 and plane 33 will move upward toward point 38. This procedure can be followed for all points on surface 37 to uniquely calibrate all vertical values. This procedure is then repeated on the surface of volume 31 furthest from the sensor.
5. The analagous procedure, using a surface sloped horizontally rather than vertically as in step 4, is then used to uniquely calibrate all horizontal values.

Figure 10:
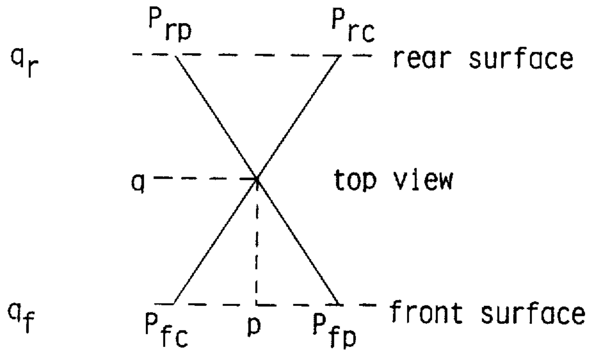
FIGS. 10 and 11 are diagrammatic views for calculating an intersection in FIG. 4 for reducing calibration time and data storage.
Figure 11:
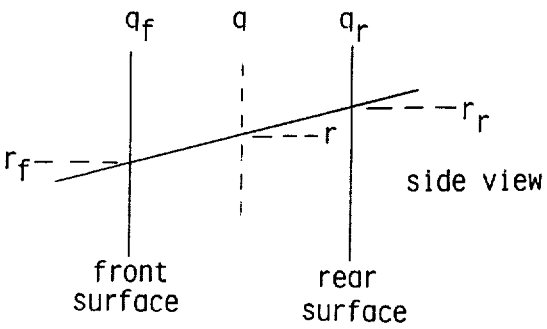

The use of these calibration tables is as follows:

1. A surface to be measured is placed in volume 41.
2. Camera ray 47-48 reports that an intersection has occurred along the ray.
3. It is known that projector ray 45-46 produced the intersection because it was the only ray projected, or if multiple rays or planes were projected, an encoding scheme enabled unique identification.
4. The intersection 49 is computed as (see FIGS. 10 and 11):

Rear surface is made parallel to front surface:

$$q=[p_{rp}-p_{rc}+p_{fp}-p_{fc})]/[(p_{rp}-p_{fp})+(p_{fc}-p_{rc})]$$

$$p=[p_{fc}(p_{rp}-p_{fp})+p_{fp}(p_{fc}-p_{rc})]/[(p_{rp}-p_{fp})+(p_{fc}-p_{rc})]$$

$$r=(q-q_f)[(r_r-r_f)/(q_r-q_f)]+r_f$$

where $p_{rp}$ = rear surface projector ray p
$p_{rc}$ = rear surface camera ray p
$q_r$ = rear surface depth
$r_r$ = rear surface camera or projector r
$p_{fp}$ = front surface projector ray p
$p_{fc}$ = front surface camera ray p
$q_f$ = front surface depth
$r_f$ = front surface r for same ray as for $r_r$ proof from similar triangles:

$$\frac{p-p_{fp}}{p_{rp}-p}=\frac{p_{fc}-p_{fp}}{p_{rp}-p_{rc}}$$

which can be rewritten as:

$$p(p_{rp}-p_{rc})-p_{fp}(p_{rp}-p_{rc})=p_{rp}(p_{fc}-p_{fp})-p(p_{fc}-p_{fp})$$

or:

$$p=[p_{fp}(p_{rp}-p_{rc})+p_{rp}(p_{fc}-p_{fp})]/[(p_{rp}-p_{rc})+(p_{fc}-p_{fp})]$$

likewise:

$$\frac{q_f-q}{q-q_r}=\frac{p_{fc}-p_{fp}}{p_{rp}-p_{rc}}$$

which can be rewritten as:

$$q_f(p_{rp}-p_{rc})-q(p_{rp}-p_{rc})=q(p_{fc}-p_{fp})-q_r(p_{fc}-p_{fp})$$

or:

$$q=[q_f(p_{rp}-p_{rc})+q_r(p_{fc}-p_{fp})]/[(p_{rp}-p_{rc}]+[(p_{fc}-p_{fp})]$$

and:

$$\frac{r-r_f}{r_r-r_f}=\frac{q-q_f}{q_r-q_f}$$

which can be rewritten as:

$$r=[(r_r-r_f)(q-q_f)/(q_r-q_f)]+r_f$$

Since one set of data on each of two surfaces is the only data required to completely describe the entire volume, a considerable reduction in calibration time and data storage is obtained by this method.

Data storage can be further reduced and computation time reduced by solving for the location of the node of the lens of the camera and the node of the lens of the projector (if a lens is used). The table of values for where the camera rays pierce the front plane can then be replaced by the camera lens node location and (if a projector lens node exists) the table of values for where the projector rays pierce the front plane can be replaced by the projector node location. The nodes are found by extrapolating all the rays back toward the node from the rear front surface tables of ray penetration points. Their common point of intersection is the node. An average of all the extra-polated values can be used to give the best estimate of the node location.

Figure 2A:
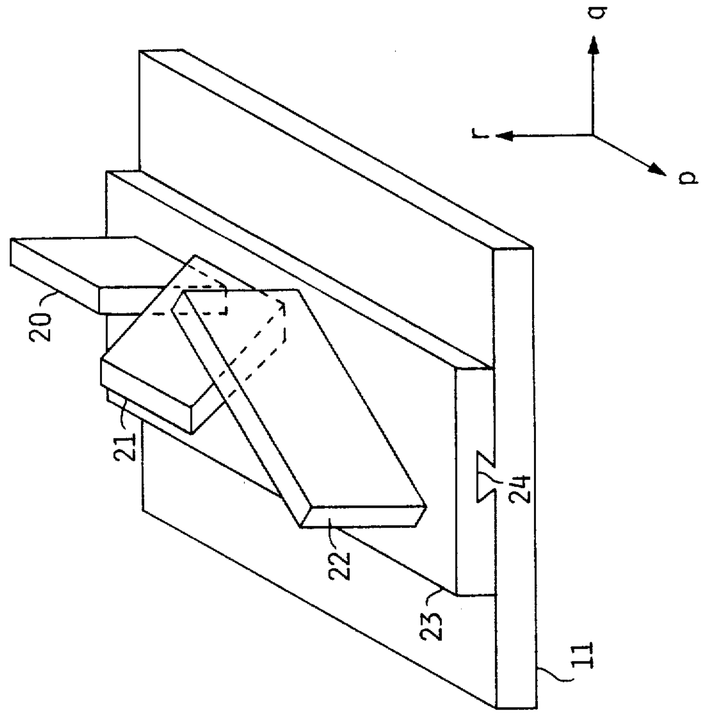
FIG. 2*a* shows 3 plates mounted on a carrier plate that slides on the transport table.
Figure 5:
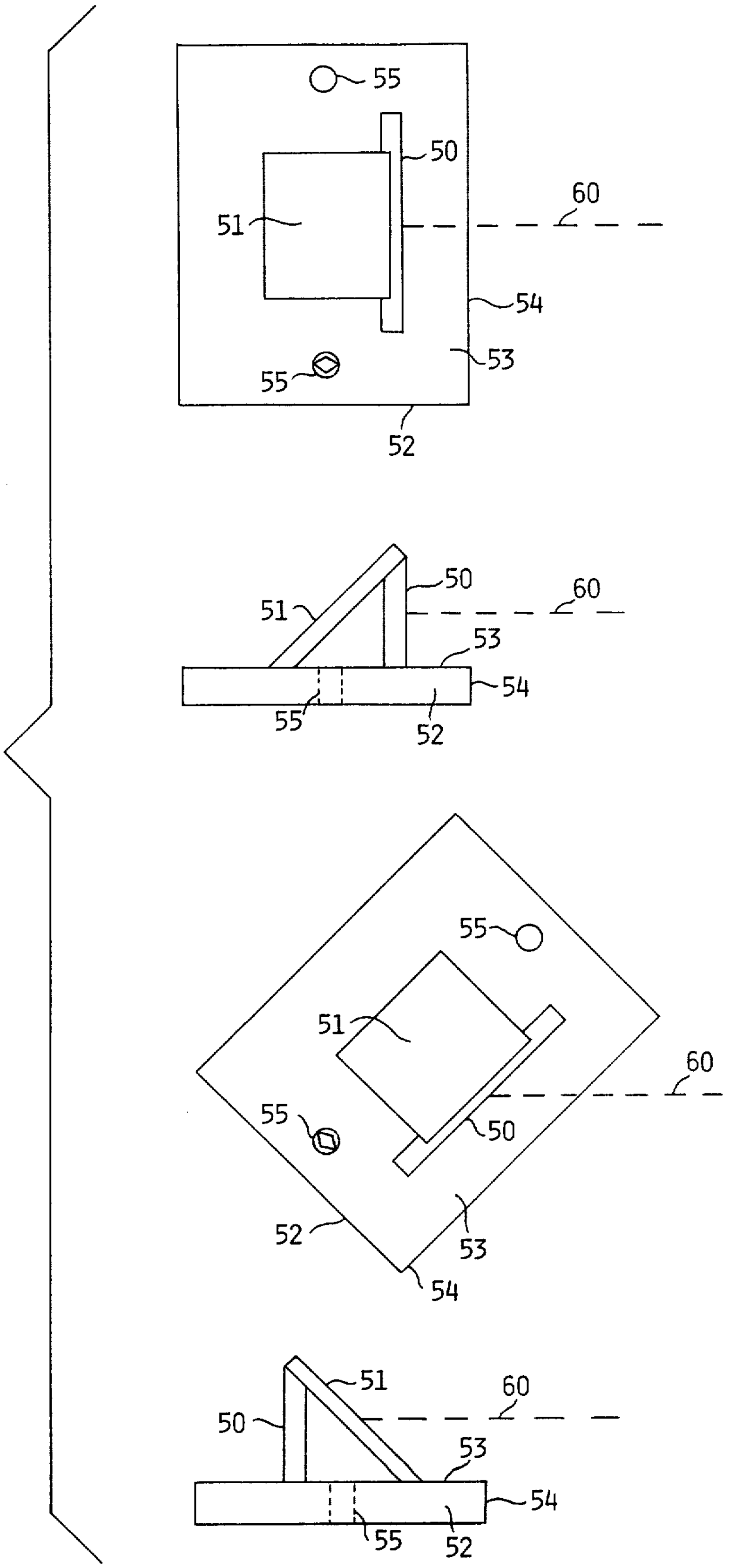
FIG. 5 illustrates a two plate calibration fixture.

FIGS. 2a and 2b have shown two preferred arrangements of providing the physical surfaces required for the calibration methods so far described. FIG. 5 shows a third variation wherein one surface is used twice so that only two calibration surfaces are required.

Surfaces 50 and 51 are flat surfaces used for calibration. They are shown in top view in 5(*a*) and side view in 5(*b*). They are mounted on a flat base surface 53 on base 54. Base 54 contains two holes for precision pinning to a translation device such as shown in FIG. 1. Flat surface 53 and flat side surface 52 of base 54 serve as convenient banking surfaces and indicating surfaces when setting up and checking the calibration system. Surface 50 is constructed to be perpendicular to the direction of translation and surface 51 is constructed preferably at 45° to the direction of translation. Surface 50 height need only be sufficient to calibrate the sensor volume height. The width of surface 50, however, has to be great enough to accommodate the sensor volume width when the surface is placed at an angle to the sensor centerline 60 as shown in top view in 5*c*.

A standard precision dowel and diamond pin arrangement would hold base 54 in place via holes 55 whil surface 50 is translated to calibrate sensor depth. Base 54 would then be placed on a second set of pins as in FIG. 5(*c*) to calibrate horizontal off-axis distance. Alternately a second pair of holes could be placed in base 54 to use the first set of pins for both angle placements. Finally, as shown in a side view in FIG. 5(*d*), base 54 would be placed on the first set of pins with sloping surface 51 facing the sensor to enable calibrating off-axis distance vertically.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method of calibrating three-dimensional measurement sensors comprising the steps of: placing a first flat plate in a sensor volume to be calibrated; adjusting said first plate surface to be orthogonal to a horizontal centerline of the sensor; translating said first plate along said sensor centerline while recording distance traveled; associating said distances with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating said second plate along said sensor centerline while recording distance traveled; associating said distances with measured height by said sensor in accord with vertical slope; determining deviations from said first predetermined angle and said horizontal parallelism of said second plate surface and correcting said measured height accordingly; removing said second plate and placing a third flat plate in said sensor volume with said third plate surface at a second predetermined angle to said translation direction sloping horizontally and parallel vertically to said first plate surface; translating said third plate along said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

2. A method as defined in claim 1, wherein said translating steps are along at least two translation directions.

3. Apparatus for calibrating three-dimensional measurement sensors comprising: three plates with surfaces having flatness corresponding to a predetermined accuracy; a common base for mounting said plates; means for moving each surface into a sensor volume; a first one of said plates being orthogonal to a horizontal centerline of the sensor; a second one of said plates being horizontally parallel to said first plate and sloped vertically to said sensor centerline; a third one of said plates being vertically parallel to said first plate and sloped horizontally to said sensor centerline.

4. Apparatus for calibrating three-dimensional measurement sensors comprising: three plates with surfaces having flatness corresponding to a predetermined accuracy; a first one of said plates being orthogonal to a horizontal centerline of the sensor; a second one of said plates being mounted horizontally parallel to said first plate and sloping vertically from the top edge of said first plate; a third one of said plates being mounted vertically parallel to said first plate and sloping horizontally from a side edge of said first plate.

5. Apparatus for calibrating three-dimensional measurement sensors comprising: two plates with surfaces having flatness corresponding to a predetermined accuracy; a first one of said plates being orthogonal to a horizontal centerline of the sensor; a second one of said plates being mounted horizontally parallel to said first plate and sloping vertically from the top edge of said first plate.

6. Apparatus as defined in claim 5, wherein said plates are mounted on a common base with flat banking surfaces for indicating calibration, and precision holes for locating by pin pairs.

7. A method requiring a minimum amount of data for calibrating a three-dimensional sensor for which linear interpolation can be used with calibrated points on opposing surfaces of a sensor volume, comprising the steps of: placing a first flat plate at one surface of a sensor volume to be calibrated; adjusting said first plate surface to be orthogonal to a horizontal centerline of the sensor; translating said first plate through a distance along said sensor centerline to the opposing surface of said sensor volume and associating said distance with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating said second plate along said centerline while recording distance traveled; associating said distances with measured height by said sensor in accord with vertical slope; determining deviations from said first predetermined angle and said horizontal parallelism of said second plate surface and correcting said measured height accordingly, removing said second plate and placing a third flat plate in said sensor volume with said third plate surface at a second predetermined angle to said translation direction sloping horizontally and parallel vertically to said first plate surface; translating said third plate along said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

8. A method as defined in claim 7, wherein said translating steps are along at least two translation directions.

9. A method of providing three-dimensional measurements using two calibrated reference surfaces, comprising the steps of: projecting a light pattern in form of a plane of light from a first direction upon a surface to be measured; recording the image of said pattern upon said surface from a second direction at a predetermined angle from said first direction; light rays from said image when extended in both directions intersecting with said calibrated reference surfaces; locating the intersections of the light rays from said image with said two calibrated reference surfaces; light rays from said projected light pattern intersecting with said calibrated reference surfaces; locating the intersections of the light rays from said projected light pattern and the two said calibrated reference surfaces; and computing from said intersections the coordinates of said image on said surface to be measured by linear interpolation.

10. A method calibrating three-dimensional measurement sensors comprising the steps of: placing a first flat plate in a sensor volume to be calibrated; adjusting said first plate surface to be orthogonal to a horizontal centerline of the sensor; translating the sensor relative to said first plate along said sensor centerline while recording distance traveled; associating said distances with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating the sensor relative to said second plate along said sensor centerline while recording distance traveled; associating said distances with measured height by said sensor in accordance with vertical slope; determining deviations from said first predetermined angle and said horizontal parallelism of said second plate surface and correcting said measured height accordingly; removing said second plate and placing a third flat plate in said sensor volume with said third plate surface at a second predetermined angle to said translation direction sloping horizontally and parallel vertically to said first plate surface; translating the sensor relative to said third plate along said sensor centerline while recording distance traveled; associating said distance with measured lateral distance by said sensor in accord with horizontal slope; determining deviations from said second predetermined angle and said vertical parallelism of said third plate surface and correcting said measured lateral distance in accordance with said deviations.

11. A method as defined in claim 10, wherein said translating steps are along at least two translation directions.

12. A method requiring a minimum amount of data for calibrating a three-dimensional sensor for which linear interpolation can be used with calibrated points on opposing surfaces of a sensor volume, comprising the steps of: placing a first flat plate at one surface of a sensor volume to be calibrated; adjusting said first plate surface to be orthogonal to a horizontal centerline of the sensor; translating the sensor relative to said first plate through a distance along said sensor centerline to the opposing surface of said sensor volume and associating said distance with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating the sensor relative to said second plate along said centerline while recording distance traveled; associating said distances with measured height by said sensor in accord with vertical slope; determining deviations from said first predetermined angle and said horizontal parallelism of said second plate surface and correcting said measured height accordingly, removing said second plate and placing a third flat plate in said sensor volume with said third plate surface at a second predetermined angle to said translation direction sloping horizontally and parallel vertically to said first plate surface; translating the sensor relative to said third plate along said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

13. A method as defined in claim 12, wherein said translating steps are along at least two translation directions.

14. A method of calibrating three-dimensional measurement sensors comprising the steps of: placing a first flat plate in a sensor volume to be calibrated; adjusting said first plate surface to be orthogonal to a horizontal centerline of the sensor; translating said first plate along said sensor centerline while recording distance traveled; associating said distances with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating said second plate along a direction different from said sensor centerline while recording distance traveled; associating said distances with measured height by said sensor in accord with vertical slope; determining deviations from said first predetermined angle and said horizontal parallelism of said second plate surface and correcting said measured height accordingly; removing said second plate and placing a third flat plate in said sensor volume with said third plate surface at a second predetermined angle to said translation direction sloping horizontally and parallel vertically to said first plate surface; translating said third plate along said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

15. A method of calibrating three-dimensional measurement sensors comprising the steps of: placing a first flat plate in a sensor volume to be calibrated; adjusting said first plate surface to be orthogonal to a horizontal centerline of the sensor; translating said first plate along said sensor centerline while recording distance traveled; associating said distances with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating said second plate along said sensor centerline while recording distance traveled; associating said distances with measured height by said sensor in accord with vertical slope; determining deviations from said first predetermined angle and said horizontal parallelism of said second plate surface and correcting said measured height accordingly; removing said second plate and placing a third flat plate in said sensor volume with said third plate surface at a second predetermined angle to said translation direction sloping horizontally and parallel vertically to said first plate surface; translating said third plate along a direction different from said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

16. A method of calibrating three-dimensional measurement sensors comprising the steps of: placing a first flat plate in a sensor volume to be calibrated; adjusting said first plate surface to be orthogonal to a horizontal centerline of the sensor; translating said first plate along said sensor centerline while recording distance traveled; associating said distances with measured depth by said sensor; determining deviations from orthogonality of said translation relative to said first plate surface and correcting said measured depth accordingly; removing said first plate and placing a second flat plate in said sensor volume with said second plate surface at a first predetermined angle to said translation direction sloping vertically and parallel horizontally to said first plate surface; translating said second plate along a direction different from said sensor centerline while recording distance traveled; associating said distances with measured height by said sensor in accord with vertical slope; determining deviations from said first predetermined angle and said horizontal parallelism of said second plate surface and correcting said measured height accordingly; removing said second plate and placing a third flat plate in said sensor volume with said third plate surface at a second predetermined angle to said translation direction sloping horizontally and parallel vertically to said first plate surface; translating said third plate along a direction different from said sensor centerline while recording distance traveled; associating said distances with measured lateral distance by said sensor in accord with horizontal slope; determining deviations from said second predetermined angle and said vertical parallelism of said third plate surface and correcting said measured lateral distance in accordance with said deviations.

* * * * *

UNITED STATES PATENT AND TRADEMARK OFFICE

CERTIFICATE OF CORRECTION

PATENT NO. : 4,682,894

DATED : July 28, 1987

INVENTOR(S) : Richard Schmidt, Howard Stern, Alex Mauro, Joseph Ross

It is certified that error appears in the above-identified patent and that said Letters Patent is hereby corrected as shown below:

| | | |
|---|---|---|
| column 2 | line 58: | change "twoard" to -- toward -- |
| 2 | 68: | after "same" insert -- point -- |
| 3 | 63: | change "$q_m$" to -- $-\Delta q_m$ -- |
| 4 | 48: | change "assume" to -- assumed -- |
| 5 | 35: | change "slidaway" to -- slideway -- |
| 6 | 18: | change "cos ι" to -- cos i -- |
| 6 | 23: | change "pin" to -- p -- |
| 6 | 24: | change "ι" to -- i -- |
| 6 | 51: | change "plate" to -- plane -- |
| 7 | 33: | change "path" to -- plate -- |
| 7 | 59: | above the equation for q, insert -- if $q_r = -q_f$ -- |
| 7 | 59: | in the equation after "q=" insert -- $q_f$ -- |
| 7 | 61: | in the equation for p, change the last term to read -- $(p_{fc} - p_{rc})]$ -- |
| 7 | 62: | cancel this entire line |
| 8 | 6: | cancel "proof from" |

UNITED STATES PATENT AND TRADEMARK OFFICE
CERTIFICATE OF CORRECTION

PATENT NO. : 4,682,894

DATED : July 28, 1987

INVENTOR(S) : Richard Schmidt, Howard Stern, Alex Mauro, Joseph Ross

It is certified that error appears in the above-identified patent and that said Letters Patent is hereby corrected as shown below:

| | | |
|---|---|---|
| 8 | 7: | before "similar" insert -- proof from -- |
| 8 | 18: | in the equation, change the last term to read -- $(p_{fc} - p_{fp})]$ -- |
| 8 | 19: | cancel this entire line |
| 8 | 32: | in the equation, change the last term to read -- $+(p_{fc} - p_{fp})]$ -- In the denominator, change "$(p_{rp} - p_{rc}]$" to -- $(p_{rp} - p_{rc})$ -- |
| 8 | 33: | cancel this entire line |
| 8 | 58: | after "rear" insert -- and -- |
| 8 | 60: | change "extra-polated" to -- extrapolated -- |
| 9 | 16: | change "whil" to -- while -- |

Signed and Sealed this

Twenty-eighth Day of June, 1988

*Attest:*

DONALD J. QUIGG

*Attesting Officer*

*Commissioner of Patents and Trademarks*